United States Patent
Ackley et al.

(10) Patent No.: US 6,199,044 B1
(45) Date of Patent: Mar. 6, 2001

(54) UNIVERSAL DATA INPUT AND PROCESSING DEVICE, SUCH AS UNIVERSAL POINT-OF-SALE DEVICE FOR INPUTTING AND PROCESSING BAR CODE SYMBOLS, DOCUMENT IMAGES, AND OTHER DATA

(75) Inventors: H. Sprague Ackley, Seattle; Pavel A. Maltsev, Edmonds; Michael Ohanian, Everett, all of WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/085,532

(22) Filed: May 27, 1998

(51) Int. Cl.[7] ................................................. G10L 15/22
(52) U.S. Cl. ........................................ 704/275; 704/270
(58) Field of Search ..................................... 704/200, 251, 704/270, 275; 382/116; 345/469; 234/472.02 380

(56) References Cited

U.S. PATENT DOCUMENTS

| | | | |
|---|---|---|---|
| 3,896,266 | * 7/1975 | Waterbury | 235/380 |
| 5,163,111 | * 11/1992 | Baji et al. | 704/200 |
| 5,410,141 | * 4/1995 | Koenck et al. | 235/472.02 |
| 5,426,745 | * 6/1995 | Baji et al. | 345/469 |
| 5,513,272 | * 4/1996 | Bogosian, Jr. | 382/116 |
| 5,536,024 | 7/1996 | Ackley | 235/454 |
| 5,659,431 | 8/1997 | Ackley | 359/798 |
| 5,729,741 | * 3/1998 | Liaguno et al. | 704/270 |
| 5,839,104 | * 11/1998 | Miller et al. | 704/251 |

* cited by examiner

Primary Examiner—David D. Knepper
(74) Attorney, Agent, or Firm—Perkins Coie LLP

(57) ABSTRACT

A universal data input device includes a processor coupled to memory and a two-dimensional or area imager. One or more additional data input modules input wireless (e.g., RF), audio (e.g., voice), card or other data. Software performed by the processor receives the input data, and in one embodiment, receives voice commands. A task manager instructs an application layer to execute appropriate applications based on the voice command, and routes data to the appropriate applications.

33 Claims, 3 Drawing Sheets

UNIVERSAL DATA INPUT AND PROCESSING DEVICE, SUCH AS UNIVERSAL POINT-OF-SALE DEVICE FOR INPUTTING AND PROCESSING BAR CODE SYMBOLS, DOCUMENT IMAGES, AND OTHER DATA

TECHNICAL FIELD

The invention relates generally to input devices such as devices for reading bar code and other machine-readable symbols.

BACKGROUND OF THE INVENTION

Data is often input to computers or processors using optical input systems. One rapid method of inputting data into a processor employs bar code symbologies, where data is encoded in varying widths, bars, and spaces. An optical input system such as an LED pen or laser scanner provides information to the processor of a bar code reader, where the information represents the widths of the bars and spaces.

The processor in turn decodes these widths into appropriate data characters. To improve information density, linear bar code symbologies are being replaced by two-dimensional bar code symbologies. Two-dimensional symbologies, as opposed to traditional bar code symbologies, encode data in two directions. While two-dimensional symbologies, such as PDF417, can be read and decoded using a laser scanner, most two-dimensional symbologies require a two-dimensional image to be captured, digitized and analyzed. For example, a two-dimensional charge-coupled device (CCD) produces a series of electrical signals that represent an image, much like a digital photograph. A processor then stores and analyzes the digital image to locate and decode a two-dimensional symbol located within the image.

Laser scanners in point-of-sale terminals are specifically designed to rapidly decode linear bar code symbols (particularly UPC symbols) on products. Such laser scanner point-of-sale terminals can read only bar code symbols, and typically only bar code symbols selected from a preprogrammed symbology. Readers for two-dimensional symbologies are more complex, because they must identify at least one type of two-dimensional symbology within a field of background noise (e.g. text). While two-dimensional readers can decode a larger number of machine-readable symbologies, such two-dimensional readers are restricted to inputting and decoding machine-readable symbologies.

An operator of a reader or a cashier at a point-of-sale terminal must manually input any additional information into a reader or cash register by either receiving verbal information from a customer or reading data from a document (e.g., coupon), and then manually inputting the data. Other input devices are necessary to input additional data, such as card readers for reading magnetic stripes on credit cards.

SUMMARY OF THE INVENTION

The inventors have discovered that many data input functions can be combined within a single universal input device to thereby realize numerous benefits. For example, a universal point-of-sale device can include a two-dimensional imager for inputting not only machine-readable symbol data, but also alphanumeric text, images, etc. As a result, the two-dimensional imager can input data to a processor from various documents, such as lottery tickets, drivers' licenses, personal checks, certain predetermined forms, envelopes, etc. Likewise, data input via card readers, such as magnetic stripe card and smart card readers, can be input via a card reader module into the processor. Furthermore, an audio input unit can receive voice instructions, which are digitized, converted and input to the processor. A wireless data receiver can receive electronic signals wirelessly, such as data from remotely readable tags.

The universal input device thereby receives data from a variety of input sources. Redundant circuitry, such as redundant processors, are eliminated by consolidating various input devices into the single universal input device. Software operating in the universal input device may receive voice instructions to identify a particular object or document being imaged. The universal input device can then more rapidly and efficiently decode or otherwise analyze such object based on the prior knowledge of the type of object.

In a broad sense, one embodiment of the invention is directed to an apparatus having a processor, at least two data input modules, and a memory. The data input modules are coupled to the processor and receive image and audio, wireless or externally stored data. The memory is coupled to the processor and stores the received data, including an image of an object.

Another embodiment of the invention includes a method of processing data having the steps: (a) providing a stored image of an object having at least two different images of machine-readable data, wherein one of the two different images is an image of a machine-readable symbol on the object or a single image not of a symbology; (b) decoding the image of the machine-readable symbol, if present; (c) receiving a voice command; and (d) analyzing a portion of the stored image for the other of the two different images of machine-readable data based on the received voice command.

BRIEF DESCRIPTION OF THE DRAWINGS

In the drawings, like reference numbers refer to similar elements or steps. Additionally, the most significant digit in a reference numeral refers to the figure number in which the element is first introduced (e.g., element 204 is first introduced in FIG. 2).

DETAILED DESCRIPTION OF THE INVENTION

A data input and processing device, and in particular, an apparatus and corresponding method for inputting and processing image data and other external data (e.g., wireless, audio, and card-based data) is described in detail below. In the following description, numerous specific details are set forth, such as specific documents, software subroutines for analyzing data, etc., to provide a thorough understanding of the invention. One skilled in the relevant art will readily recognize that the invention can be practiced without one or more of the specific details, or with other documents, routines, etc. In other instances, well-known structures or operations are not shown or described in detail to avoid obscuring aspects of the invention.

Hardware Components

Figure 1:
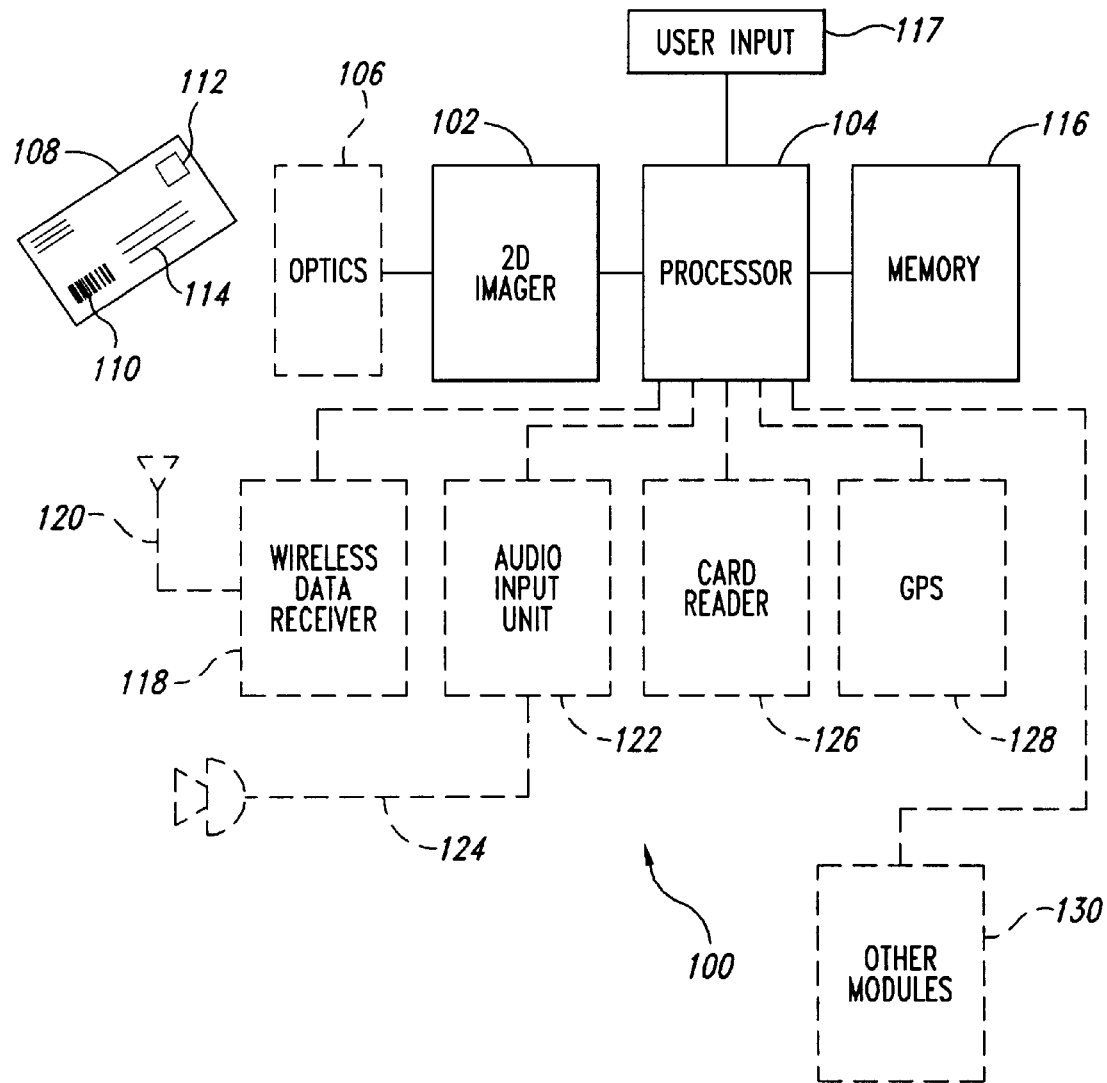
FIG. 1 is a partial schematic, partial block diagram of a universal data input system under an exemplary embodiment of the invention.

Referring to FIG. 1, a universal data input device 100 includes a two-dimensional imager 102 coupled to a processor 104. The two-dimensional imager 102 captures a two-dimensional image using, for example, a two-dimensional CCD having a square or rectangular active surface of light-sensitive elements. The rectangular element array of the two-dimensional CCD defines a field of view of the two-dimensional imager 102. Other known image capture or light-sensitive devices can be used, such as vidicons, two-dimensional semiconductor arrays, such as APS (active pixel sensor), or a linear CCD array having mechanical means to pivot the array or object being imaged to provide resolution in an axis perpendicular to the linear axis of the array. Appropriate conventional focusing or light gathering optics 106, electronics and/or a light source can be provided for use with the two-dimensional imager 102. Details regarding two-dimensional image capture devices can be found, for example, in U.S. Pat. No. 5,536,924, entitled "Method and Apparatus for Matrix Symbology Imager," and U.S. Pat. No. 5,659,431, entitled "Fixed Mount Imager Using Optical Module for Reading One or Two-Dimensional Symbology Data."

As is known, each pixel element in the CCD array of the two-dimensional imager 102 outputs a varying level signal, i.e., an analog signal that determines the intensity of light impinging upon the particular light-sensitive element. In the exemplary embodiment, the CCD array in the two-dimensional imager 102 outputs a gray level signal, however, the two-dimensional imager in an alternative embodiment produces a multilevel color signal. The signals output from the CCD array are similar to video data or analog signals, and the two-dimensional imager 102 can digitize the signals for input to the processor 104. Alternatively, the processor 104 can include an analog-to-digital converter to convert the gray level analog signals to digital signals. While the exemplary embodiment employs the two-dimensional imager 102, those skilled in the relevant art will readily recognize that other image sampling or capture devices can be employed under principles of the invention, such as laser scanners, pen-based scanners, etc.

The processor 104 may include a high speed clock so that the processor and two-dimensional imager 102 operate at high speed. While the exemplary embodiment employs a single processor 104, those skilled in the relevant art will recognize that the universal input device 100 can employ multiple processors that divide tasks or routines, as noted below.

A memory 116, coupled to the processor 104, stores digital signals output from the processor. The memory 116 preferably includes both volatile and non-volatile memory (e.g., random access and electronically erasable read-only memory). An object or image within the field of view of the two-dimensional imager 102 is converted into electrical signals that are digitized and stored in the memory 116 to be retrieved and processed by the processor 104 under routines described below. For example, a document 108 can include a linear bar code symbol 110, image of a person 112, and alphanumeric text 114. The universal input device 100 images and stores a digital image of the document 108 in the memory 116 for later processing by the processor 104. Rather than first being processed by the processor 104, signals output from the two-dimensional imager 102 can be directly input to the memory 116 using known techniques, such as direct memory access (DMA). As used herein, the term "stored image" generally refers to an image from the field of view stored in the memory 116 which contains an image of a document to be read or object to be analyzed.

The term "processor" as used herein generally refers to any logic processing unit, such as one or more central processing units (CPUs), digital signal processors (DSPs), application-specific integrated circuits (ASIC), etc. While the processor 104, two-dimensional imager 102, memory 116 and other elements of the universal input device 100 are shown as separate blocks, some or all of these blocks may be monolithically integrated into a single chip.

The universal input device 100 may be a fixed mount or a hand held device and include a trigger switch, shown in FIG. 1 as a user input 117. Alternatively, or in addition to the trigger, the user input 117 may include a keyboard, touch-sensitive display, trackball, or other input device for permitting a user to input signals to the processor 104. By activating the trigger switch, the processor 104 causes the two-dimensional imager 102 to provide image signals to the processor 104 that constitute an instantaneous image or scan within the field of view of the imager. The specific means and methods for storing an image of a document by the universal input device 100 are conventional and will be understood by those skilled in the relevant art without any further description.

As used generally herein, the term "document" refers generically to any object having visual information from which the two-dimensional imager 102 produces a stored image which is processed by the processor 104. Examples of such documents include products having bar code information as well as alphanumeric text and/or images, as well as traditional documents such as lottery tickets, merchandise coupons, bank checks and other financial instruments, passports, drivers' licenses and other forms of identification, etc. As used generally herein, the term "lottery tickets" refers generically to any gambling or gaming device, such as scratch lottery tickets, lottery tickets requiring one or more numbers to be selected from a larger set of numbers, pull tabs, raffle tickets, etc.

In the exemplary embodiment, the universal input device 100 includes electronics (and optional optics) for capturing an image of a document and processing this image to analyze image data such as decoding machine-readable symbols. The universal input device 100 also includes one or more additional data input modules, such as those shown as broken lines blocks 118, 122, 126 and 128 in FIG. 1. The various data input modules that provide data to the processor 104 may either be permanently coupled to the processor in the universal input device 100, or removably replaceable as separate modules (e.g., as PCMCIA cards, replaceable integrated circuit boards in expansion slots, etc.).

A first data input module is a wireless data receiver 118 having an antenna 120 that receives wireless communication signals, such as data signals from RF tags. The wireless data receiver 118 can receive wireless electronic communications from various other sources, and input all of such received data to the processor 104. Wireless communications, including RF tags, are described, for example, in U.S. patent application Ser. No. 09/050,623, entitled "Wireless Line of Sight Communication System and Apparatus," filed Mar. 30, 1998, and assigned to the same assignee as this invention.

An audio input unit 122 includes a microphone 124 for receiving voice or audio input data. As explained below, a user can input voice commands to the processor 104, through the audio input unit 122, to identify a particular document being imaged by the two-dimensional imager 102 or processed by the processor. The audio input unit 122 may not only amplify and digitize audio input data, but perform additional functions. For example, the audio input unit 122 may include speech-to-text capabilities for converting speech into ASCII or other digital formats. Overall, the audio input unit 122 may receive both audio data and voice commands for operating the universal input device 100.

A card reader 126 receives data from various types of cards storing such data. For example, the card reader 126 can include a magnetic stripe reader to read data encoded in magnetic stripes on cards such as credit cards. Additionally, the card reader 126 can include a smart card reader for reading smart cards that contain embedded, electrically readable memories. Furthermore, the card reader 126 can include a slot for receiving data or program instructions stored in non-volatile memory such as found in PCMCIA cards, or cartridges containing read-only memory (ROM).

The universal input device 100 may include many additional other modules 130 for inputting data to the processor 104. For example, a global positioning system (GPS) unit 128 may provide positioning data that indicates where the universal input device 100 is currently located. The universal input device 100 may include security or identification verifying devices, such as fingerprint scanners, tactile sensors (such as for fingerprints), retinal imagers, voice recognition units, etc.

Each of the circuits and modules, shown as blocks in FIG. 1, are of a type known in the art, and one skilled in the relevant art would be able to use such circuits and modules in the described combination to practice the invention. The internal details of these circuits are neither part of, nor critical to, the invention. Therefore, a detailed description of the internal circuit operation is not required for each of these blocks. Similarly, each of the steps and routines depicted in FIGS. 2 and 3 (described below) are of a type well known in the art and may themselves include a sequence of operations that need not be described herein.

The various elements and modules of the universal input device 100 are preferably enclosed within a single, substantially small housing. As a result, the universal input device 100 may be readily portable by a user, or positioned in a fixed location without requiring substantial space. By employing a single processor 104, processors typically located within various devices (e.a., in RF tag readers, audio input devices, card readers, etc.) are eliminated, as well as other redundant circuitry. Therefore, the universal input device 100 provides a lower cost input device over individual input devices. The universal input device 100 can be used in countless applications including commercial environments, such as at point-of-sale stations; data collection in a variety of environments, including warehouses, manufacturing plants, etc.; financial institutions for verifying financial documents; military applications for inputting data and verifying the identity of individuals; etc.

Software Components

Figure 2:
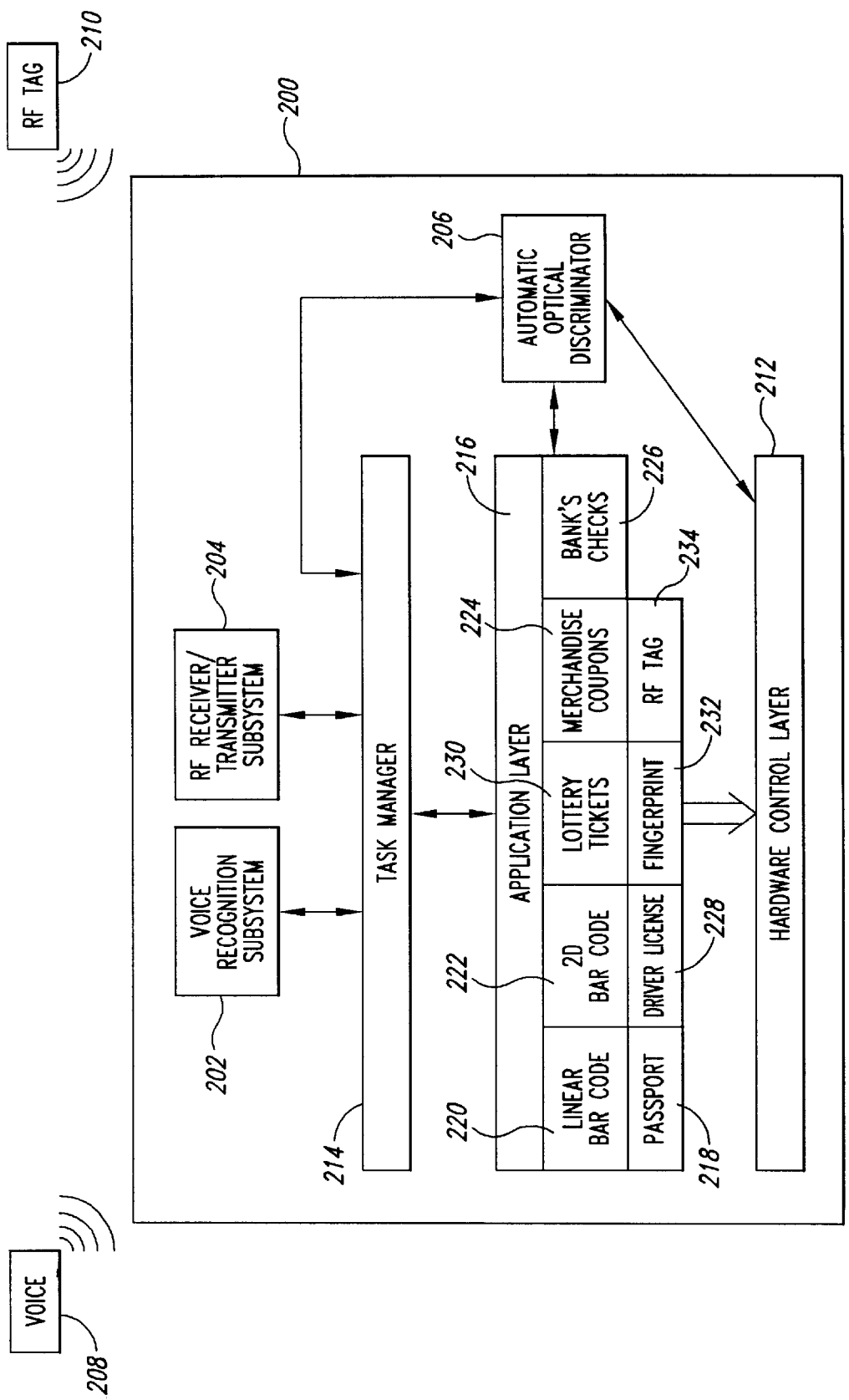
FIG. 2 is a block diagram of software processes performed by a processor in the universal input device of FIG. 1.

Referring to FIG. 2, the various software layers and subsystems of a software system 200 performed by the processor 104 are shown. Three data input subsystems, a voice recognition subsystem 202, an RF receiver/transmitter subsystem 204 and an automatic optical discriminator 206, receive voice, RF and optical data, respectively. For example, the voice recognition subsystem 202 receives voice data 208 provided via the audio input unit 122 to the processor 104. The RF transceiver subsystem 204 similarly receives RF data from an RF tag 210, via the wireless data receiver 118. The voice recognition subsystem 202 employs conventional voice recognition algoritlinis to interpret the voice data 208 from a user. The RF receiver/transmitter subsystem 204 employs conventional (and often standardized) protocols for receiving and processing commands and data transmitted from the RF tag 210.

The optical discriminator 206 works in conjunction with a hardware control layer 212 to retrieve the stored image from the memory 116. The automatic optical discriminator 206 analyzes the stored image to identify certain predetermined images, such as images of machine-readable symbols, alphanumeric text, signatures, photographs of individuals, graphics, etc. The optical discriminator 206 performs digital image analysis techniques for identifying digitized images of image data. For example, to identify machine-readable symbols, the optical discriminator 206 may employ identification routines such as those described in U.S. patent application Ser. No. 08/602,624, entitled "Method and Apparatus for Locating and Decoding Machine-Readable Symbols," U.S. patent application Ser. No. 08/687,659, entitled "Time-Efficient Method of Analyzing Imaged Input Data to Locate Two-Dimensional Machine-Readable Symbols or Other Linear Images Therein," U.S. patent application Ser. No. 08/803,366, entitled "Apparatus and Method of Rapidly Locating Edges of Machine-Readable Symbols or Other Linear Images," or U.S. patent application Ser. No. 08/814,001, entitled "Method and Apparatus for Automatic Discriminating and Locating Patterns Such as Finder Patterns, or Portions Thereof, in Machine-Readable Symbols," all of which are assigned to the assignee of this invention. The hardware control layer 212 performs conventional low-level data exchange between the hardware systems in the universal input device 100.

A task manager 214 receives task flags from the voice recognition subsystem 202, RF transceiver subsystem 204, and optical discriminator 206. The task manager receives data from the various data input modules, including digital image data from the two-dimensional imager 102 and optical discriminator 206, audio data from the audio input unit 122 and voice recognition subsystem 202, and radio frequency data from the wireless data receiver 118 and RF transceiver subsystem 204. The task manager 214 can receive data from other input sources, such as position data from the card reader 126 and GPS unit 128. Based on the type of data received, the task manager 214 generates instructions for executing a particular application to decode, authenticate or otherwise analyze data input to the universal input device 100.

An application layer 216 receives specific instructions from the task manager 214 to launch or execute a particular application based on data input to the universal input device 100. The application layer 216 includes numerous applications that it executes based on the instructions received from the task manager 214. The task manager 214 passes received data to the executed application by the application layer 216.

For example, the universal input device 100 may be a hand-held device employed by a customs agent. The agent obtains a stored image of a passport ("images" the passport) and provides a voice command "passport" to the audio input unit 122. The voice recognition subsystem 202 recognizes the voice command "passport" and in response thereto, the task manager 214 provides an execute passport application command to the application layer 216. The application layer 216 then executes a passport application 218 to process the stored image of the passport.

The passport application 218 provides instructions to the hardware control layer 212, which in turn instructs the processor 104 and memory 116 to provide image data from the memory to the optical discriminator 206. The optical discriminator 206 then identifies specific optical data within the stored image. For example, based on the passport application 218, the optical discriminator 206 identifies a photograph or image of the passport holder, typically within a predetermined location of the stored image. Similarly, the optical discriminator 206 identifies alphanumeric text and/or a machine-readable symbol, also within a predetermined location of the stored image. The optical discriminator 206 then provides such identified data back to the passport application 218 (either directly, through the hardware control layer 212, or through the task manager 214). The passport application 218 decodes the machine-readable symbol or alphanumeric text to generate a corresponding numeric character string (e.g., in ASCII format) that can be displayed on a display device of the universal input device 100. The character string may also be output to an external device for comparison or verification with data in a database. The digitized image of the photograph of the passport holder may be displayed and/or output to an external computer for verification with a similar digitized image stored in an external database. Importantly, the voice instructions 208 interpreted by the voice recognition subsystem 202 causes the task manager 214 to execute an appropriate application in the application layer 216 so that the optical discriminator 206 rapidly identifies desired information within the stored image and the executed application can rapidly decode, verify or analyze the information.

The universal input device may be used in a variety of environments where the user provides voice commands to execute desired applications in the application layer 216. For example, the universal input device 100 can be employed as a fixed mount, point-of-sale device, where a cashier receives various documents, including linear bar codes and two-dimensional symbols on products, merchandise coupons, bank checks, drivers' licenses, lottery tickets, etc. The user provides appropriate voice commands, such as "bar code," "symbol," "coupon," "bank checks," "driver's license" and "lottery ticket" to execute a linear bar code application 220, a two-dimensional symbol application 222, a merchandise coupon application 224, a bank check application 226, a driver's license application 228 and a lottery ticket application 230, respectively.

As another example, the universal input device can be employed as a point-of-sale terminal. A cashier receives, for example, a preprinted lottery ticket where a customer has selected one or more numbers by filling corresponding ovals or boxes with opaque pencil or ink marks, circling selected numbers, etc. The cashier images the ticket and provides the voice instruction "lottery ticket" to the audio input unit 122. The processor 104 under direction of the task manager 214 and application layer 216 executes the lottery ticket application 230. The lottery ticket application 230 retrieves an image of the lottery ticket from the memory 116. Fiducials or other markings on the lottery ticket facilitate the optical discriminator 206 or lottery ticket application 230 in aligning the image of the ticket with a predetermined image to corresponding ovals. The lottery ticket application 230 then identifies which ovals have been filled in by the customer. Alternatively, the lottery ticket can have numbers handwritten by the customer. The lottery ticket application 230 employs optical character recognition technology to automatically interpret and convert such numbers into numeric values.

By executing the appropriate application 218–230 by means of appropriate command flags from the task manager 214, the optical discriminator 206 can rapidly locate and provide stored image data to the executed application based on the document being processed. As noted above with respect to a passport, many documents contain predetermined image data at predefined locations. The optical discriminator 206 can rapidly identify such data in a stored image when the discriminator has prior knowledge of what to identify in the stored image. The optical discriminator 206 or one or more applications 218–230 may include optical character recognition (OCR) routines for optically recognizing and converting printed or handwritten images of alphanumeric characters into digital or numeric values such as ASCII values.

The application layer 216 can also include applications for authenticating a user. For example, a fingerprint application 232 receives fingerprint data from a fingerprint reader (not shown). If the RF transceiver 204 receives radio frequency data from the RF tag 210, the task manager 214 instructs the application layer 216 to execute an RF tag decode application 234, and routes the received RF data thereto.

The software system 200 of FIG. 2 includes a default mode when the task manager 214 receives no voice command. As a result, the task manager 214 instructs the application layer 216 to perform the most recently executed applications. The task manager 214 assumes that the currently imaged document is similar to the previously analyzed document. Alternatively, the task manager 214 instructs the application layer 216 to execute the statistically most commonly executed applications over a predetermined number of previous samples. In this alternative, the application layer 216 continually monitors executed applications to develop a table of the most commonly executed applications over the predetermined number of previous samples. In yet another alternative embodiment, the task manager 214 in its default mode instructs the application layer 216 to execute, sequentially, applications in a predetermined order, such as first executing the linear bar code application 220 to determine whether the stored image contains any linear bar codes, thereafter executing the two-dimensional bar code application 222, and so on.

The application layer 216, the task manager 214, and other layers and subsystems of the software system 200 are performed by the processor 104. In sum, the task manager 214 receives data from the various input sources, identifies the appropriate application to process the received data, and routes such data to the application layer 216. In response thereto, the application layer 216 executes the appropriate application, and the received data is processed by the executed application. While not shown, the software system 200 employs an appropriate operating system, as well as interfaces for exchanging data between the various blocks shown in FIG. 1.

Figure 3:
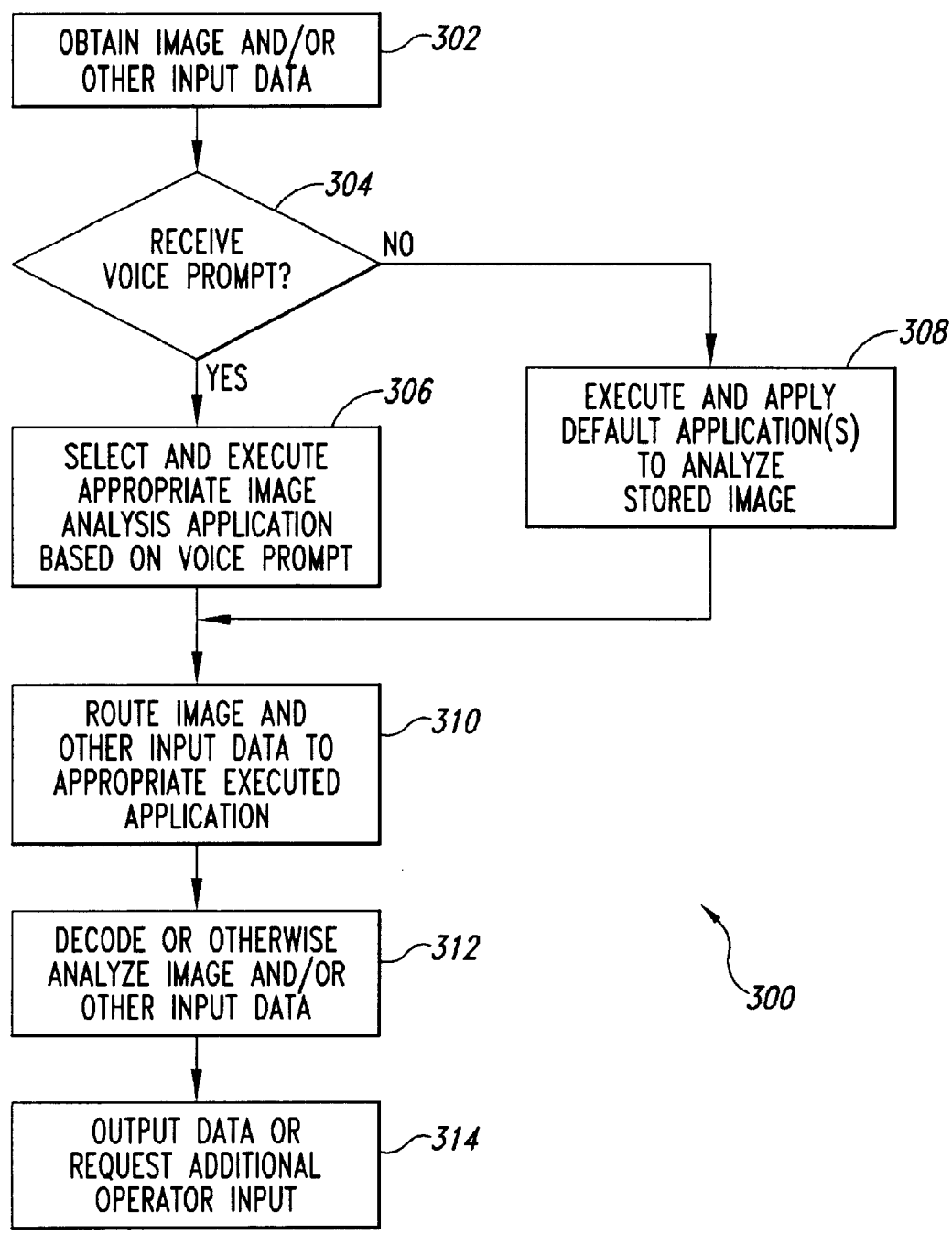
FIG. 3 is a flowchart of steps performed by the universal input device of FIG. 1.

Referring to FIG. 3, a flowchart of a routine 300 showing basic steps performed by the software system of FIG. 2 is shown. Those skilled in the relevant art can create source code based on the flowchart of FIG. 3, the software architecture of FIG. 2, and the detailed description provided herein. The software system 200 of FIG. 2 and the routine 300 of FIG. 3 are preferably stored in the memory 116. Alternatively, some of the software, such as some of the software applications 218–234 are stored in the corresponding input modules 118–128 (such as in hardware). The software system 200 and the routine 300 can be stored not only in non-volatile random access memory (RAM), but also in removable media, such as discs, or hard wired in chips, such as PROM.

In step 302, the two-dimensional imager 102, processor 104 and memory 116 obtain and store input image data from a document, such as the document 108 (FIG. 1). The processor 104 may also receive wireless data such as data from the RF tag 210, or data from a card via the card reader 126.

In step 304, the task manager 214 determines whether it receives a voice command or prompt from the voice recognition subsystem 202. If a voice command is received, then in step 306, the task manager 214 instructs the application layer 216 to execute the application corresponding to the voice command. If the task manager 214 does not receive a voice command, then in step 308, the task manager executes and applies default applications to analyze the stored image and/or other received data. In step 310, the task manager 214 routes the image and/or other received input data to the executed application(s).

In step 312, the executed application(s) decode or otherwise analyze the image and/or other input data. For example, the linear bar code application 220 decodes images of linear bar codes in the stored image, while the lottery ticket application 230 converts handwritten marks for selected lottery numbers on a lottery ticket into corresponding ASCII values. In step 314, the processor 104, via the executed application(s) output the decoded or analyzed data to a host computer, server or other system which requires the data (such as for display on a display device). Additionally, or alternatively, the processor 104 requests additional input, such as input by a user through the user input 117. Such additional user input can be the input of a personal identification number (PIN), verification or authorization of an individual, etc. Alternatively, the processor 104 in step 314 can request data from other sources, such as data stored in a database (not shown) to verify received input data with data stored in the database.

Although specific embodiments of, and examples for, the invention are described herein for illustrative purposes, various equivalent modifications are possible within the scope of the invention, as those skilled in the relevant art will recognize. The teachings provided herein of the invention can be applied to analyzing other objects, not necessarily the exemplary passport, lottery ticket, and financial instruments described above. Various other data input modules can be employed to provide greater data input sources for analysis by the processor 104.

All of the above U.S. patents and applications are incorporated by reference. Aspects of these U.S. patents and applications can be employed with the teachings of the invention to provide further combinations.

These and other changes can be made to the invention in light of the above detailed description. In general, in the following claims, the terms used should not be construed to limit the invention to the specific embodiments disclosed in the specification and the claims, but should be construed to include all data input systems and methods that operate under the claims to provide universal methods for inputting and analyzing data. Accordingly, the invention is not limited by the disclosure, but instead its scope is to be determined entirely by the following claims.

What is claimed is:

1. A data input apparatus comprising:

a processor;

a two-dimensional image capture system coupled to the processor;

a memory coupled to the processor, wherein the processor, two-dimensional image capture system and memory are configured to capture a series of two-dimensional images produced from documents or products, and wherein the memory stores an image of a document having at least first and second image portions of machine-readable data within the stored image of the document, wherein the first image portion is an image of a machine-readable symbol on the document;

an audio input unit coupled to the processor, wherein the audio input unit receives and provides to the processor voice commands, including a speech command representing an identification of the document provided to the processor; and wherein the memory stores an integrated set of instructions for the computer for (a) accessing the first and second image portions, (b) decoding the first image portion of the machine-readable symbol under control of a first module, (c) processing the received speech command representing the identification of the document, and (d) analyzing the second image portion based on the received speech command under control of a second module.

2. The apparatus of claim 1, further comprising an RF tag reader coupled to the processor.

3. The apparatus of claim 1, further comprising a card reader, coupled to the processor, that reads magnetic stripe cards or cards having embedded integrated circuit memory devices.

4. The apparatus of claim 1, further comprising an individual authentication device, coupled to the processor, that verifies a personal characteristic of a user.

5. The apparatus of claim 1, further comprising a keyboard and a display device coupled to the processor, wherein the keyboard receives user input and the display device outputs data.

6. A method of processing data comprising:

providing a stored image of an object having at least first and second image portions of machine-readable data, wherein the first image portion is an image of a machine-readable symbol on the object;

decoding the first image portion of the machine-readable symbol;

receiving a speech command representative of at least an aspect of the object; and analyzing a portion of the stored image for the second image portion of machine-readable data based on the received speech command.

7. The method of claim 6 wherein the object is a document having a graphic, wherein the speech command identifies the document and wherein the analyzing includes analyzing a predetermined portion of the stored image for an image of the graphic.

8. The method of claim 6 wherein the object is a lottery ticket, wherein the speech command identifies the lottery ticket, and wherein the analyzing includes analyzing a predetermined portion of the stored image for an image of a portion of the lottery ticket.

9. The method of claim 6 wherein the object is a bank check, wherein the speech command identifies the bank check, and wherein the analyzing includes analyzing a predetermined portion of the stored image for an image of a portion of the bank check.

10. The method of claim 6 wherein the object is a personal identification document, wherein the speech command identifies the personal identification document, and wherein the analyzing includes analyzing a predetermined portion of the stored image for an image of a portion of the personal identification document.

11. An apparatus comprising:

a processor;

at least one data input module coupled to the processor that receives image, audio or wireless data from an object having one of a plurality of types;

memory coupled to the processor that stores the received data;

an integrated software system stored in the memory and having instructions performed by the processor, wherein the software system includes,
a data input subsystem that receives the received data, wherein the received data includes a speech command representing a type of the object,
an application layer that executes one of a plurality of applications, and
a task layer that (a) commands the application layer to execute the one application based on the type of the object and based on the received speech command, and (b) forwards at least a portion of a remainder of the received data to the application layer for analysis by the one application.

12. The apparatus of claim 11, further comprising a hardware layer in the software system that controls the data input module.

13. The apparatus of claim 11 wherein the object is a document, wherein the apparatus includes an audio input module and an image input module, wherein the audio input module receives the speech command indicating the type of the document, while the image input module receives image data from the object, and wherein the task layer commands the application layer to execute the one application based on the speech command.

14. The apparatus of claim 11 wherein the data input subsystem includes at least two of an optical discriminator subsystem, an audio interpretation subsystem and a radio frequency transceiver subsystem.

15. The apparatus of claim 11, further comprising a hand-held housing enclosing the processor, memory, data input module and software system.

16. The apparatus of claim 11 wherein the data input module is removably coupled to the processor.

17. The apparatus of claim 11, further comprising an RF tag reader coupled to the processor.

18. The apparatus of claim 11, further comprising a card reader coupled to the processor that reads data held by cards.

19. The apparatus of claim 11, further comprising a human verification device coupled to the processor that verifies a personal characteristic of a user.

20. The apparatus of claim 11, further comprising:
a keyboard and a display device coupled to the processor, wherein the keyboard receives user input and the display device outputs data; and
a housing that at least partially encloses the processor, data input module, memory, keyboard and display device.

21. The apparatus of claim 11 wherein the data input module is manually removable from the apparatus.

22. The apparatus of claim 11, further comprising a laser scanner coupled to the processor.

23. The apparatus of claim 11, further comprising a two-dimensional area imager coupled to the processor.

24. The apparatus of claim 11, further comprising a global positioning system.

25. The apparatus of claim 11 wherein the image data is an image of a lottery ticket.

26. The apparatus of claim 11 wherein the image data is an image of a bank check.

27. The apparatus of claim 11 wherein the image data is an image of a personal identification document.

28. A computer readable medium having stored therein a method for operating a computer, wherein the method includes:
receiving a stored image of an object under a first module, wherein at least a portion of the image includes machine-readable data;
receiving a speech command under a second module, wherein the received speech command is representative of at least an aspect of the object; and
selectively analyzing the portion of the stored image for the machine-readable data based on the received speech command representative of at least the aspect of the object.

29. The method of claim 28 wherein the object is a document having a graphic, wherein the speech command identifies the document and wherein the analyzing includes analyzing a predetermined portion of the stored image for an image of the graphic.

30. An apparatus comprising:
a processor;
at least one data input module receiving image data from documents, wherein the data input module is coupled to the processor;
a speech input module coupled to the processor and that receives speech commands representing the documents; and
a memory coupled to the processor that stores integrated instructions causing the processor to receive the image data and convert at least an identified portion of the image data into numeric values based on the received speech commands representing the documents, wherein the image data includes bar code symbols and human generated marks on the documents, and wherein the speech commands represent first and second predetermined types of documents comprising the bar code symbols and human generated marks, respectively.

31. The apparatus of claim 30 wherein the data input module receives image data from a lottery ticket.

32. The apparatus of claim 30 wherein the data input module receives image data from a bank check.

33. The apparatus of claim 30 wherein the data input module receives image data from a personal identification document.

* * * * *